United States Patent [19]

Sato et al.

[11] Patent Number: 4,945,300
[45] Date of Patent: Jul. 31, 1990

[54] POWER SOURCE CONTROL APPARATUS

[75] Inventors: Toshifumi Sato; Motoki Ide, both of Tokyo, Japan

[73] Assignee: NEC Corporation, Tokyo, Japan

[21] Appl. No.: 303,213

[22] Filed: Jan. 30, 1989

[30] Foreign Application Priority Data

Jan. 29, 1988 [JP] Japan ................................. 63-19210

[51] Int. Cl.$^5$ ............................................. G05B 24/02
[52] U.S. Cl. .................................. 323/318; 307/592; 307/601; 307/269; 365/227
[58] Field of Search ................ 323/282, 283, 284, 285, 323/289, 318; 365/226, 227, 228, 229; 307/269, 270, 271, 272 R, 272 A, 273, 590, 592, 597, 599, 600, 601, 602, 603; 363/19-25, 95, 97, 98, 132

[56] References Cited

U.S. PATENT DOCUMENTS

| 4,367,422 | 1/1983 | Leslie | 307/592 X |
| 4,433,390 | 2/1984 | Carp et al. | 365/226 X |
| 4,464,584 | 8/1984 | Hentzschel et al. | 307/592 X |
| 4,638,465 | 1/1987 | Rosini et al. | 365/226 X |
| 4,712,196 | 12/1987 | Uesugi | 365/229 X |

Primary Examiner—Mark O. Budd
Assistant Examiner—Emanuel Todd Voeltz
Attorney, Agent, or Firm—Sughrue, Mion, Zinn, Macpeak & Seas

[57] ABSTRACT

A power source control apparatus for use in electronic equipment of the type including a microprocessor and a main power source in the form of a battery controls a boosting circuit which boosts the output voltage of the battery to produce an operating voltage of the equipment. Connected in parallel to the battery are the boosting circuit and a power switch for producing a power ON/OFF signal. A reset/set flip-flop is connected between the boosting circuit and the power switch. The boosting circuit is operable only when the output of the flip-flop has a set state. Even when the power ON/OFF signal becomes a low level, i.e., OFF state, the flip-flop maintains its output in a set state until a power control signal is fed thereto from the external equipment. The period of time for which the operating power should be held after the turn-off of the power switch can be freely determined to suit the external equipment. Further, a reset signal generating circuit is provided for producing a predetermined reset signal depending upon the state of the flip-flop output.

6 Claims, 6 Drawing Sheets

POWER SOURCE CONTROL APPARATUS

BACKGROUND OF THE INVENTION

The present invention relates to a power source control apparatus for use in electronic equipment of the type using a microprocessor and powered by a main power source in the form of a battery. More particularly, the present invention is concerned with a power source control apparatus for controlling a boosting circuit which boosts a battery voltage for producing an operating voltage of electronic equipment.

Electronic equipment using a microprocessor and including a main power source in the form of a battery is extensively used today. A power source control apparatus for this type of electronic equipment is constituted by a power source or battery, a power switch and a boosting circuit which are connected in parallel to the battery, and a voltage detecting circuit connected to the boosting circuit. In response to an operator's power ON or power OFF operation, the power switch delivers a power ON or a power OFF signal to the boosting circuit while feeding it to external electronic equipment via a power ON/OFF signal output terminal. The boosting circuit is implemented by a DC/DC converter, for example. In response to the power ON signal, the boosting circuit boosts the output voltage (e.g. +1.5 volts) of the battery to +5 volts, for example, while the power ON signal is present. The output voltage of the boosting circuit is fed to the external electronic equipment via a power output terminal for operating it and to the voltage detecting circuit.

The voltage detecting circuit is responsive to a positive-going edge and a negative-going edge of the operating voltage (+5 volts) and delivers a reset signal representative of those edges to the electronic equipment via a reset signal output terminal. Consequently, upon the turn-on of the power switch, the electronic equipment is supplied with the operating voltage (+5 volt) to start on a predetermined operation thereof. When the power is turned on, the external equipment executes predetermined initialization processing in response to a reset signal; when the power source is turned off, it executes various kinds of processing such as memory back-up processing and switching various peripheral circuits associated with the microprocessor to a power saving mode operation, during the interval between the appearance of a power OFF signal and that of a reset signal.

In the prior art power source control apparatus described above, the boosting circuit stops its operation immediately after the turn-off of the power switch and, hence, the operation voltage of the electronic equipment is lowered relatively rapidly after the turn-off of the power switch until it disappears. Since the voltage detecting circuit generates a reset signal as soon as the voltage level being lowered after the turn-off of the power switch crosses a predetermined level, the equipment has to complete the various kinds of processing previously stated within the interval between the reception of the power OFF signal and the reception of the reset signal. Such an interval is so short that the contents or the range which can be processed is limited. An approach heretofore adopted with prior art electronic equipment of the type using a microprocessor for eliminating this problem is to execute particular kinds of processing which have priority over the others in the event of the turn-off of the power source by way of example. However, such a scheme is not easy to practice.

In the initial stage of operation of the boosting circuit, its output voltage is unstable. Hence, when the power switch of equipment of the above-described type is turned on and off repetitively, if not ordinarily, within a short period of time, accurate reset signals cannot be fed to the microprocessor and therefore bring the latter out of control. Further, such electronic equipment is sometimes provided with a back-up RAM so that the RAM may be powered by the battery upon the turn-off of the power switch so as to hold data therein. In this case, there is a fear that the data held in the RAM are disturbed or altered by external noise. Electronic equipment has heretofore been provided with no implementation for eliminating such an occurrence.

SUMMARY OF THE INVENTION

It is therefore an object of the present invention to provide a power source control apparatus which, immediately after the turn-off of a power switch, does not lower an operating voltage under a predetermined condition and feeds a predetermined voltage to external electronic equipment.

It is another object of the invention to provide a power source control apparatus which surely causes external electronic equipment into an inoperable condition during an unstable period immediately after the turn-on of an operating voltage.

It is another object of the present invention to provide a power source control apparatus which causes a back-up RAM into an inoperable condition while a power switch is turned off.

It is another object of the present invention to provide a generally improved power source control apparatus.

A power source control apparatus for controlling a power source which comprises a battery and feeding an operating voltage to external electronic equipment of the present invention comprises a power switch connected in parallel to the battery for generating a power ON/OFF signal when the power switch is turned on and off; a boosting circuit connected in parallel to the battery for boosting an output voltage of the battery to produce the operating voltage and deliver the output voltage as a source voltage, and a control unit for controlling the boosting circuit such that the boosting circuit continuously produces the source voltage for a predetermined period of time.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
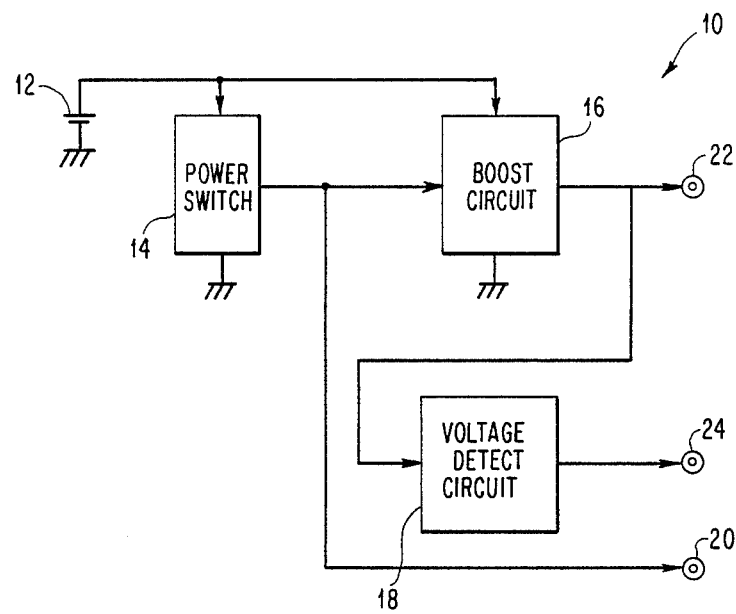
FIG. 1 is a schematic block diagram showing a prior art power source control apparatus.

To better understand the present invention, a brief reference will be made to a prior art power source control apparatus for electronic equipment of the type using a microprocessor and a battery, shown in FIG. 1. As shown, the power source control apparatus, generally 10, is constituted by a power source or battery 12, a power switch 14 and a boosting circuit 16 which are connected in parallel to the battery 12, and a voltage detecting circuit 18 connected to the boosting circuit 16. In response to an operator's power ON or power OFF operation, the power switch 14 delivers a power ON or a power OFF signal to the boosting circuit 16 while feeding it to external electronic equipment via a power ON/OFF signal output terminal 20. The boosting circuit 16 is implemented by a DC/DC converter, for example. In response to the power ON signal, the boosting circuit 16 boosts the output voltage (e.g. +1.5 volts) of the battery 12 to +5 volts, for example, while the power ON signal is present. The output voltage of the boosting circuit 16 is fed to the external electronic equipment via a power output terminal 22 for operating it and to the voltage detecting circuit 18.

The voltage detecting circuit 18 detects a positive-going edge and a negative-going edge of the operating voltage (+5 volts) and delivers a reset signal representative of those edges to the electronic equipment via a reset signal output terminal 24. Consequently, upon the turn-on of the power switch 14, the electronic equipment is supplied with the operating voltage (+5 volts) to start on a predetermined operation thereof. When the power is turned on, the external equipment executes predetermined initialization processing in response to a reset signal; when the power is turned off, it executes various kinds of processing such as memory back-up processing and switching various peripheral circuits associated with the microprocessor to a power saving mode operation, during the interval between the appearance of a power OFF signal and the appearance of a reset signal.

In the prior art power source control apparatus 10 described above, the boosting circuit 16 stops its operation immediately after the turn-off of the power switch 14 and, hence, the operating voltage of the electronic equipment is lowered relatively rapidly after the turn-off of the power switch 14 until it disappears. Since the voltage detecting circuit 18 generates a reset signal as soon as the voltage level being lowered after the turn-off of the power switch 14 crosses a predetermined level, the equipment has to complete the various kinds of processing previously stated within the interval between the reception of the power OFF signal and the reception of the reset signal. Such an interval is so short that the contents or the range which can be processed is limited.

In the initial stage of operation of the boosting circuit 16, its output voltage is unstable. Hence, when the power switch of equipment of the above-described type is turned on and off repetitively, if not ordinarily, within a short period of time, accurate reset signals cannot be fed to the microprocessor and therefore cause the latter out of control. Further, such electronic equipment is sometimes provided with a back-up RAM so that the RAM may be powered by the battery upon the turn-off of the power switch 14 so as to hold data therein. In this case, there is a fear that the data held in the RAM are disturbed or changed by external noise.

Figure 2:
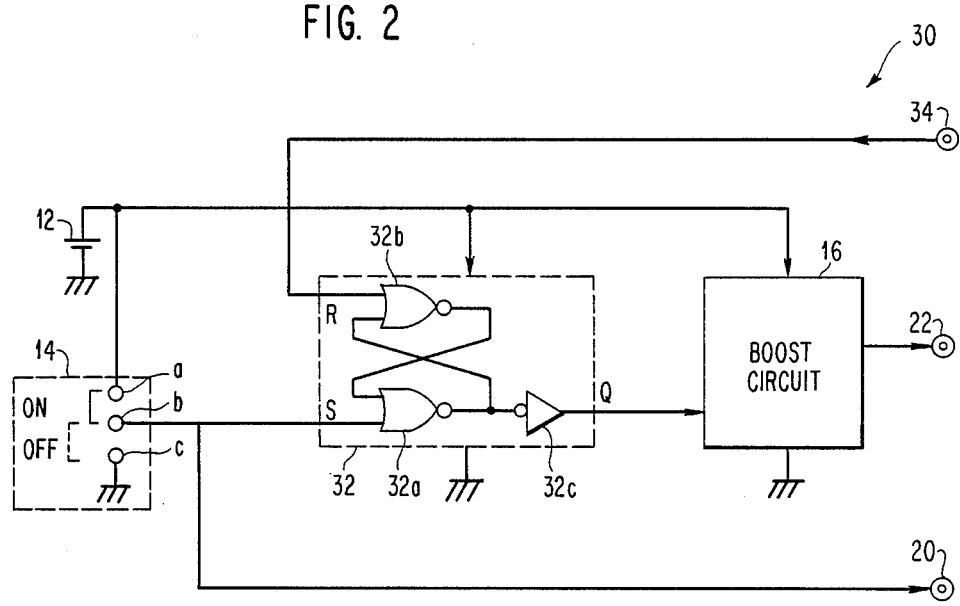
FIG. 2 is a schematic block diagram showing a power source control apparatus embodying the present invention.

Referring to FIG. 2, one embodiment of the power source control apparatus in accordance with the present invention is shown. In the figure, the same or similar structural elements as those shown in FIG. 1 are designated by like reference numerals. As shown, the power source control apparatus, generally 30, is different from the prior art control apparatus 10 in that the voltage detecting circuit 18 of the prior art is omitted, in that a reset/set flip-flop 32 is interposed between a power switch 14 and a boosting circuit 16 and powered by a battery 12, and in that a power control signal input terminal 34 is provided. The power switch 14 produces on its terminal b a power ON signal when the terminal b is connected to a terminal a and a power OFF signal when the terminal b is connected to a terminal c. The terminal b is connected to a power ON/OFF signal output terminal 20 and a set input terminal S of the reset/set flip-flop 32. The flip-flop 32 is made up of two NOR gates 32a and 32b and one inverter 32c. A reset terminal R and an output terminal Q of the flip-flop 32 are connected to the power control signal intput terminal 34 and the input terminal of the boosting circuit 16, respectively. Since the operation of such a reset/set flip-flop circuitry per se is well known in the art, how its individual structural elements are operated will not be described.

Figure 3:
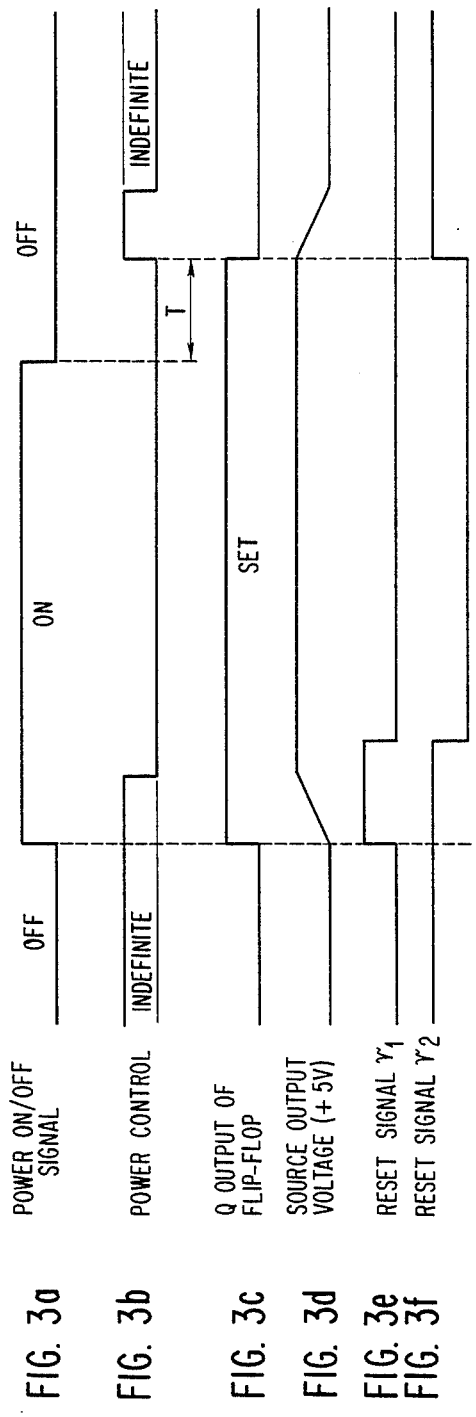
FIGS. 3A to 3F are timing charts demonstrating the operation of the embodiment of FIG. 2 as well as the other embodiments which will follow.

The operation of the power source control apparatus 30 will be described with reference to FIGS. 3A to 3F. A power ON/OFF signal appears in response the turn-on and turn-off of the power switch 14, as shown in FIG. 3A. When the power switch 14 is turned on, the power ON/OFF signal turns from a low level to a high level and is fed to the set input terminal S of the reset/set flip-flop 32 and to the power ON/OFF signal output terminal 20. This informs external electronic equipment of, but not limited to, the type using a microprocessor of the turn-on of the power switch 14. At this instant, the Q output of the flip-flop 32 turns from a reset state to a set state and is held in the latter (see FIG. 3C). In response to such a change of the Q output, the boosting circuit 16 starts on the previously stated boosting operation and continues this operation so long as the Q output is maintained in the set state. As shown in FIG. 3D, the source output voltage applied to the power output terminal 22 reaches a predetermined level (e.g. +5 volts) upon the lapse of a predetermined period of time as counted from the change of the Q output to the set state and thereafter remains stable at the predetermined level. It is to be noted that the external equipment starts on a predetermined operation as soon as the source output voltage reaches a predetermined value and, hence, a power control voltage generated by the equipment settles at a low level with accuracy immediately after the source output voltage has reached the predetermined value, as shown in FIG. 3D.

Subsequently, when the power switch 14 is turned off, the power ON/OFF signal turns to a low level and is fed to the set input terminal S of the flip-flop 32 as well as to the external electronic equipment. However, the reset/set flop-flop 32 does not change its state even if the power ON/OFF signal coupled to the set input terminal S changes to a low level, i.e., unless the input signal applied to the reset input terminal R changes. The flip-flop 32 therefore maintains its Q output in a set state, causing the source output voltage to hold the predetermined level (see FIGS. 3C and 3D). As shown in FIG. 3B, the Q output turns from the set state to a reset state for the first time when the power control signal is applied to the reset input terminal R upon the lapse of a certain period of time which is open to choice (see FIG. 3C). The boosting circuit 16 stops its operation in response to the change of the Q output to the reset state, so that the source output voltage is rapidly lowered from the predetermined level until it disappears. Since operating power associated with the external equipment disappears after the appearance of the power control signal, the signal level of the power control signal becomes unstable as soon as a predetermined period of time expires after the appearance of the same signal (see FIG. 3B). In summary, it is not that the source output voltage disappears immediately after the turn-off of the power switch 14 but that the source output voltage is maintained at the predetermined level for a predetermined period of time T until the entry of the power control signal. When the power source signal should be generated is open to choice and is determined to suit the external equipment. In electronic equipment of the type using a microprocessor, for example, the power control signal will be produced when all the kinds of required processing are completed.

Figure 4:
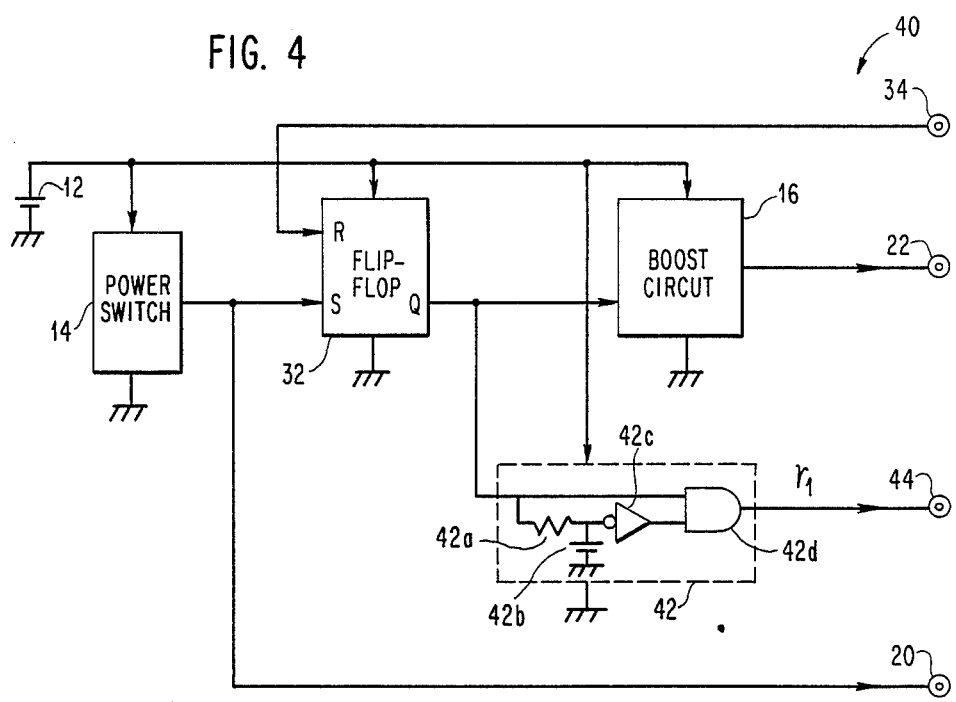
FIG. 4 is a block diagram schematically showing an alternative embodiment of the present invention.

Referring to FIG. 4, an alternative embodiment of the present invention is shown. In the figure, a power source control apparatus 40 includes a reset signal generating circuit 42 which is not present in the power source control apparatus 30 of FIG. 2. As shown, the reset signal generating circuit 42 is constituted by a delay circuit which is in turn made up of a resistor 42a and a capacitor 42b, an inverter 42c, and an AND gate 42d. As shown in FIGS. 3C and 3E, when the state of the Q output of the reset/set flip-flop 32 turns from reset to set, the reset signal generating circuit 42 generates a reset signal r1 in the form of a pulse having a predetermined duration. The reset signal r1 is applied to a reset signal output terminal 44 to be fed out to external electronic equipment. The duration of the pulse r1 is long enough to cover the unstable range which is associated with the rising portion of the source output voltage, as shown in FIG. 3E by way of example. In response to the reset signal r1, a microprocessor built in the external equipment is inhibited from operating so long as the signal r1 is present. It follows that the microprocessor is prevented from uncontrolled operations even when the power switch 14 is repetitively turned on and off within a short period of time.

Figure 5:
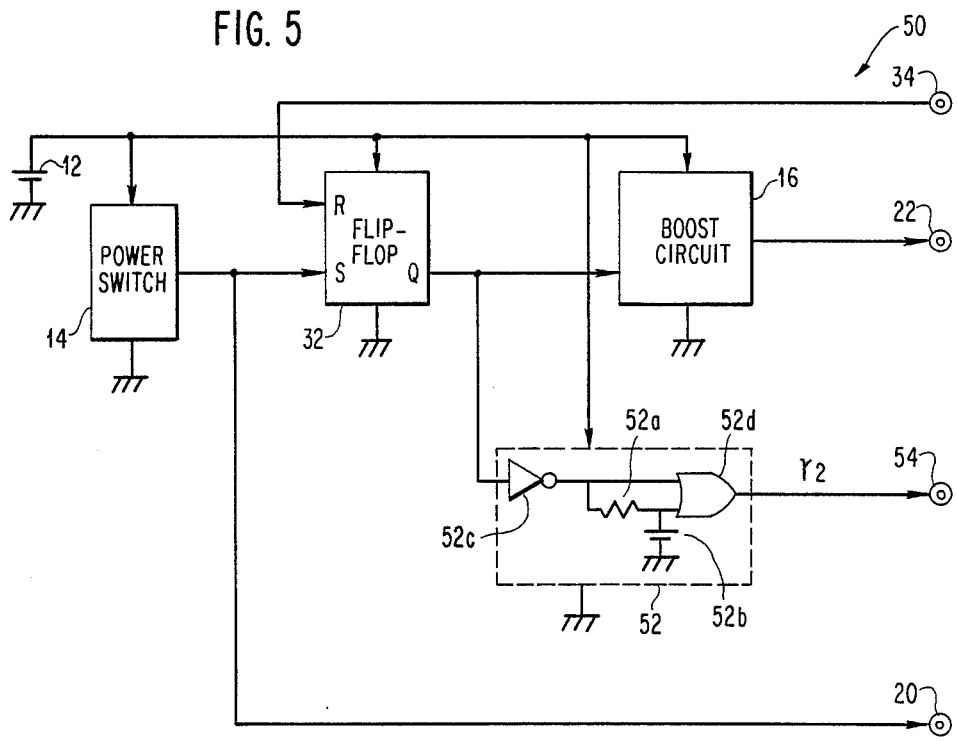
FIG. 5 is a diagram similar to FIG. 4, showing another alternative embodiment of the present invention.

FIG. 5 shows another alternative embodiment of the present invention which is generally designated by the reference numeral 50. As shown, the power source control apparatus 50 includes a reset signal generating circuit 52 which is different from the reset signal generating circuit 42 of FIG. 4. In the figure, the reset signal generating circuit 52 is comprised of a delay circuit made up of a resistor 52a and a capacitor 52b, an inverter 52c, and an OR gate 52d. The circuit 52 produces a reset signal r2 which is representative of a period of time during which the Q output of the reset/set flip-flop 32 has a set state and a predetermined period of time which follows a change of the Q output from the reset state to the set state, as shown in FIGS. 3C and 3F. The reset signal r2 is applied to a reset signal output terminal 54 to be fed out to the external equipment.

Figure 6:
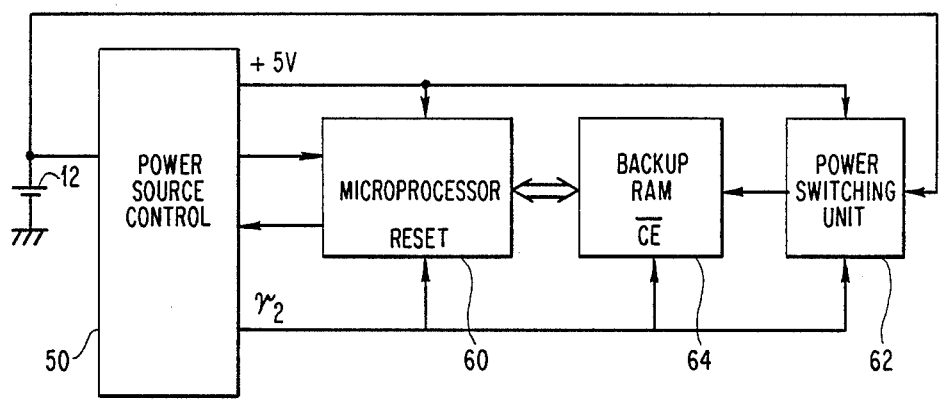
FIG. 6 is a schematic block diagram representative of a specific application of the present invention.

FIG. 6 shows a specific application of the power source control apparatus of the present invention to external electronic equipment. Specifically, the power source control apparatus of FIG. 6 is implemented by the apparatus 50 shown in FIG. 5. The source output of the power source control apparatus 50 is fed to a microprocessor 60 and a power switching unit 62. The reset signal r2 produced by the control apparatus 50 is applied to a reset terminal RESET of the microprocessor 60, a terminal $\overline{CE}$ of a back-up RAM 64, and the power switching unit 62. The control apparatus 50 delivers the power ON/OFF signal to the microprocessor 60 and is in turn supplied with the power control signal from the microprocessor 60. The battery, or main power source, 12 is connected to the power source control apparatus 50 and the power switching unit 62. The power switching unit 62 functions to switch the power to be fed to the RAM 64, depending upon the reset signal r2. The microprocessor 60 and the RAM 64 are interconnected by a bus.

In operation, during an interval in which the power switch 14 (see FIG. 5) of the power source control apparatus 50 has an OFF state and a predetermined period of time after it has been turned on, the reset signal r2 appears as previously stated (see FIG. 3F). Then, in such an interval, the microprocessor 60 and back-up RAM 64 are each held in an inoperable condition. The power switching unit 62 therefore feeds the operating power (+5 volts) to the RAM 64 while the reset signal r2 is not present and feeds the battery power to the RAM 64 while it is present. It follows that although the RAM 64 is fed even when the power switch 14 is in an OFF state, data stored in the RAM 64 are prevented from being altered by external noise or the like because the reset signal r2 continuously appears throughout such a period of time. The significance of the reset signal r2 appearing over the predetermined time after the turn-on of the power switch 14 will be understood from the previous description of the embodiment of FIG. 4.

In summary, in any of the embodiments of the present invention shown and described, a reset/set flip-flop is interposed between a power switch and a boosting circuit, the boosting circuit is so constructed as to operate only when the output of the flip-flop has a set state, and the flip-flop maintains the set state until it receives a power control signal from external electronic equipment, despite the entry of a power OFF signal. This kind of construction allows the external equipment to freely select the period of time for holding the operating power after the turn-off of the power switch. Hence, with electronic equipment of the type using a microprocessor, it is extremely easy to set up the contents of processing (e.g. memory back-up processing) which should be executed immediately after the turn-off of the operating power.

Further, a reset signal generating circuit is provided for producing a predetermined reset signal depending upon the output state of the reset/set flip-flop. Hence, it is possible to inhibit the external equipment from operating until the operating power becomes stable after the turn-on of the power switch and, if necessary, when the power switch remains in an OFF state even before the rise of the operating power. Therefore, in electronic apparatus using a microprocessor by way of example, the microprocessor is prevented from beginning to operate while the operating power is unstable. This protects data stored in a back-up RAM against changes otherwise caused by noise and the like when the power source is in an OFF state.

Various modifications will become possible for those skilled in the art receiving the teachings of the present disclosure without departing from the scope thereof.

What is claimed is:

1. A power source control apparatus for controlling a power source which comprises a battery and feeding an operating voltage to external electronic equipment, comprising:

power switch means connected in parallel to said battery for generating a power ON/OFF signal when said power switch means is turned on and off;

reset/set flip-flop means, wherein a set input to said reset/set flip-flop means is the power ON/OFF signal while a reset input to said reset/set flip-flop means is a power control signal which said external electronic equipment generates in response to the power ON/OFF signal, an output of said reset/set flip-flop means turned to a set state when said power switch is turned on and to a reset state when the power control signal is entered; and boosting means connected in parallel to said battery for boosting an output voltage of said battery to produce the operating voltage and in response to the output of said reset/set flip-flop means to deliver the output voltage as a source voltage.

2. A power source control apparatus as claimed in claim 1, wherein said reset/set means is operated in response to an output voltage of said battery.

3. A power source control apparatus as claimed in claim 1, wherein said boosting means is constructed to produce the operating voltage by boosting the output voltage of said battery when the output signal of said reset/set flip-flop has a set state.

4. A power source control apparatus as claimed in claim 1, further comprising reset signal generating means supplied with the output of said reset/set flip-flop and generating, in response to a change of the output signal from a reset state to a set state, a reset signal in the form of a pulse having a predetermined duration.

5. A power source control apparatus as claimed in claim 1, further comprising reset signal generating means supplied with the output signal of said reset/set flip-flop and generating a reset signal representative of a period of time during which the output signal has a reset state and a predetermined period of time subsequent to a change of the reset state to a set signal.

6. A power source control apparatus for controlling a power source which comprises a battery and feeding an operating voltage to external electronic equipment, comprising:

power switch means connected in parallel to said battery for generating a power ON/OFF signal when said power switch means is turned on and off;

boosting means connected in parallel to said battery for boosting an output voltage of said battery to produce the operating voltage and deliver the output voltage as a source voltage; and control means for controlling said boosting means such that said boosting means produces said source voltage in response to said power ON signal and ceases to produce said source voltage in response to a power control signal generated by said electronic equipment.

* * * * *